United States Patent [19]

Ernst et al.

[11] 4,159,052
[45] Jun. 26, 1979

[54] CLUTCH RELEASE BEARING ASSEMBLIES

[75] Inventors: Horst Ernst, Eltingshausen; Manfred Brandenstein, Aschfeld; Armin Olschewski, Schweinfurt, all of Fed. Rep. of Germany

[73] Assignee: SKF Industrial Trading and Development Company B.V., Amsterdam, Netherlands

[21] Appl. No.: 472,859

[22] Filed: May 23, 1974

[30] Foreign Application Priority Data

May 26, 1973 [DE] Fed. Rep. of Germany ....... 2327022

[51] Int. Cl.² ............................................. F16D 19/00
[52] U.S. Cl. ...................................... 192/98; 308/233
[58] Field of Search .................. 192/98, 110 B, 89 B, 192/70.27, 70.29, 70.3, 99 A; 308/233, 235

[56] References Cited

U.S. PATENT DOCUMENTS

| | | | |
|---|---|---|---|
| 1,859,352 | 5/1932 | Albee | 308/235 X |
| 2,952,453 | 9/1960 | Haussermann | 192/89 B |
| 3,093,228 | 6/1963 | Binder | 192/89 B |
| 3,212,612 | 10/1965 | Sink | 192/89 B |
| 3,365,040 | 1/1968 | Pitner | 192/98 |
| 3,610,384 | 10/1971 | Bork | 192/98 X |
| 3,712,435 | 1/1973 | Kraus | 192/70.27 |
| 3,805,934 | 4/1974 | Labadie | 192/98 |

FOREIGN PATENT DOCUMENTS

1037203 7/1966 United Kingdom ................... 192/89 B

*Primary Examiner*—Benjamin W. Wyche

[57] ABSTRACT

A clutch release bearing for use with a friction clutch for automotive vehicles having a ring-shaped spring release member. The clutch release bearing is formed as an anti-friction bearing wherein one of its race members has a portion extending axially away from the rolling bodies. The extending portion projects a distance sufficient to be inserted within the bore of the spring release member and to pass behind the rear wall and engage therewith. The race members of the bearing are made of sheet metal and are folded to provide substantially radial walls adapted to engage the front face of the spring release member or the clutch release actuating member. The projection of the one race member may be cylindrical or it may project as a ring-shaped body having slots forming resilient fingers interengaging with the arms of the spring release member.

8 Claims, 10 Drawing Figures

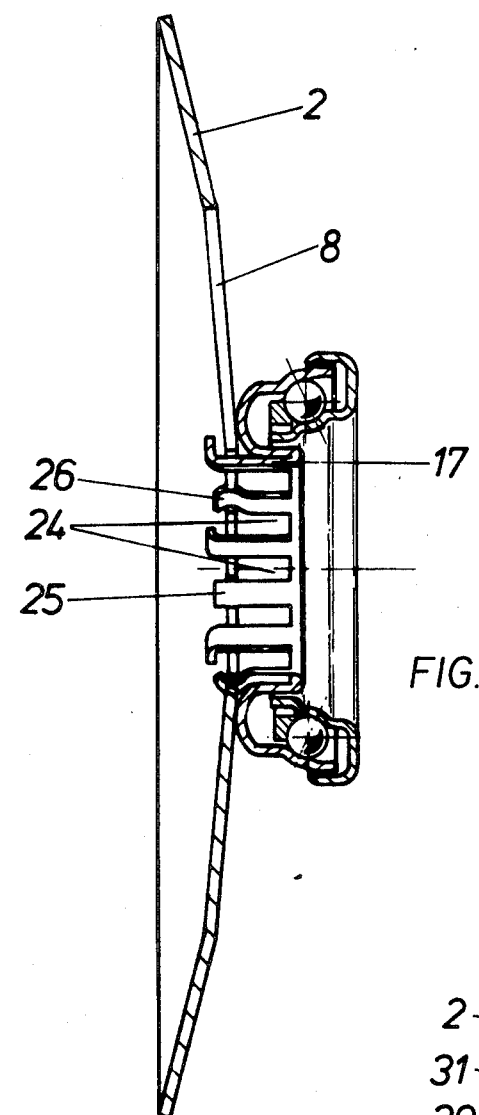
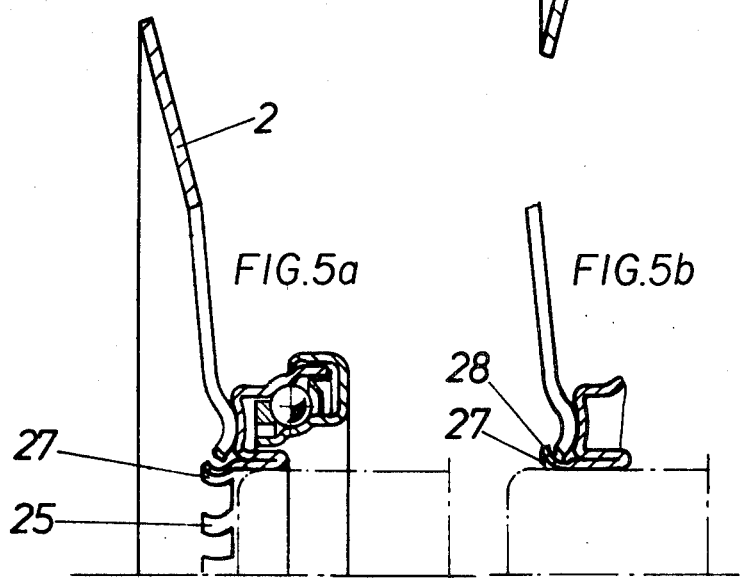
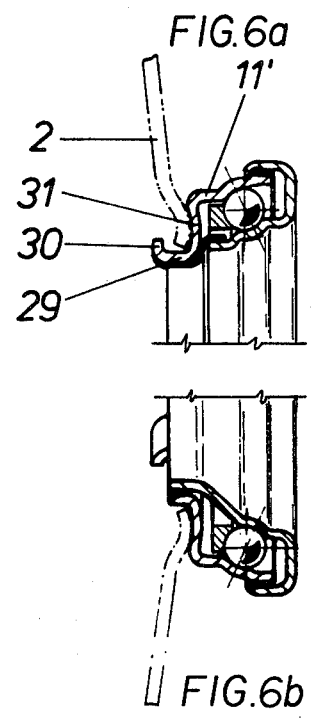

CLUTCH RELEASE BEARING ASSEMBLIES

BACKGROUND OF THE INVENTION

The present invention relates to friction clutch assemblies for motor vehicles and particularly to a continuously rotating anti-friction release bearing adapted to be attached to the friction clutch.

In general, friction clutches are provided with a spring release member which is in the form of a diaphragm or cup-shaped spring washer having a plurality of radially inwardly directed arms defining a central bore. Such spring release mechanisms are generally dish-shaped somewhat like a belleville washer or spring. The clutch release bearing itself is adapted to engage the face of the spring release member so as to be continuously self-centering and to be attached to the spring release member so as to be operable thereon. A well known construction is shown in U.S. Pat. No. 2,485,214, wherein the anti-friction release bearing is housed in a special type housing and the inner ring is extended axially therefrom. The inner ring of the bearing projects into the bore of a diaphragm type spring release member and is provided with an annular groove on its surface which engage the tongues or ends of the arms of the spring release member. This construction is very complicated due to the composite design of the housing and of the massively constructed anti-friction bearing required.

In another well known form of friction clutch, described in German patent publication DAS No. 1,555,408, the anti-friction release bearing is arranged in the plane of the belleville spring washer through its inner diameter. The outer race ring is joined securely with the arms of the belleville spring washer. This construction is likewise very complicated because the anti-friction bearing must be in the form of a massive solid heavy bearing and is mounted on a guide sleeve. The guide sleeve is itself adjustably and movably mounted on a shoulder attached to the gear housing. Furthermore, because of the arrangement of the release bearing in the plane of the belleville spring a large bore is necessary in the spring. As a result the lever arm for the release force is necessarily smaller and thus great release forces are necessary to operate the clutch. Still further, since the bearing is centered over the guide sleeve mounted on the shoulder, an unnecessarily large axial offset between the guide sleeve and the bore of the belleville spring is created. Thus additional reactive forces are exerted by the bearing on the spring and vice versa. It is thus not possible to obtain a truly self-centering bearing relative to the rotating parts of the clutch.

It has been furthermore well known to provide a clutch release bearing in which the race rings are made of thin sheet metal rather than being made of massive solid rings. In these embodiments, however, it has not been possible to provide a unitary assembly ready for installation in which the clutch and the clutch release bearing are furnished pre-assembled.

It is the object of the present invention to provide a friction clutch and release bearing assembly which overcomes disadvantages and defects of the prior art.

It is a further object of the present invention to provide a clutch release bearing and assembly in which the several parts are simple to manufacture and which can be assembled without great outlay in time or cost with the clutch to form a unitary assembly. In addition it is an object of the present invention to provide a clutch release bearing of the type described which may be easily dismantled and replaced and repaired.

It is a further object of the present invention to provide a clutch release bearing adapted for attachment to a friction clutch in which the bearing is easily centered with regard to the clutch release spring and which is further self-centering under operable load conditions.

These objects, other objects and numerous advantages will be apparent from the following disclosure of the preferred form of the present invention.

SUMMARY OF THE INVENTION

According to the present invention a clutch release bearing for attachment with a friction clutch comprising an annular spring release member having a plurality of slots forming radially inwardly directed arms defining a central bore is provided. The clutch release bearing comprises an inner and outer race member having a plurality of rolling bodies, such as balls, located therebetween. One of the race members has a portion which extends axially away from the rolling bodies to form an annular projection adapted to be inserted within the bore of the spring release member and to pass behind the rear wall to engage therewith. According to the present invention the race members are made of sheet metal and are light in weight and mass being thus substantially self-supporting in the spring release member.

Through the use of a release bearing having race rings made of sheet metal, the radial constructional dimension of the bearing and its weight is substantially reduced, from those known in the prior art. The ring-shaped annular projection running axially, in one of the race members is engaged with and supported in the bore of the spring release member. This insures more adequate centering of the bearing in relation to the spring release member both during assembly and during operation.

Further, according to the present invention, it is preferred that the bearing race ring having the axial projection is folded over into a U-shaped or Z-shaped cross section which provides on the one hand a reinforcement of the race member and on the other a smaller overall outer diameter for the axial projection. As a result the bore of the spring release member can be made smaller than heretofore known and still receive the supporting axial projection. Further, as a result of this construction the lever arm of the resilient arms of the spring release member is increased in size so that in operation a significantly lower actuating force is needed to induce movement in the spring release member.

Preferably, the race member is folded into a U-shaped cross section in which the axial projection is formed by folding over the sheet metal at an angle of 180° on itself to form a pair of axial abutting shanks which act to strengthen the race member.

Furthermore, in order to insert the bearing projection easily within the bore of the spring release member, the axial projecting portion is provided with a plurality of axially directed slots, which form axially extending fingers extending resiliently and cantilevered outwardly of the bearing race member. In order to prevent the bearing from twisting in the spring release member it is preferred to provide the arms of the spring release member with its own projections which engage within the slots formed on the race member of the bearing.

In order to fix the release bearing within the bore of the release spring, against axial dislodgement, the free end of the axially extending projection is provided with either an annular flange directed radially outwards, or several tangs or fins distributed over its periphery and also directed mainly radially outwards. The radially outward flange or tangs engage behind the spring release member and prevents the bearing from shifting axially. It is particularly advantageous to use several tangs distributed over the periphery of the extending portion, since the bearing may be easily inserted by passing the tangs through the slots between the arms of the spring release member and thereafter slightly twisting the bearing to lock the tangs behind the adjacent arms.

According to a further aspect of the present invention it is possible to insert an annular ring-shaped elastic component such as a spring washer, a snap ring, or even a worm spring between the radially extending flanges or tangs formed on the axial projection of the bearing race member and the rear wall of the spring release member. This permits the resilient and movable assembly of the bearing and the spring release member while also removing any excess axial play.

In order to improve the self-centering action of the bearing, the bearing projecting portion has a slightly smaller outer diameter than the bore of the spring release member so that a certain degree of radial play is provided between the two parts. This allows the bearing to move under normally operably load conditions.

It is a further aspect of the present invention to provide the projecting portion of the bearing race ring member with a wall which engages the front surface of the arms of the spring release member. Preferably this surface is given a convex or concave curvature conforming to the curvature of the arms of the spring release member.

Full details of the present invention are given in the following description of its preferred form and are shown in the accompanying drawings.

DESCRIPTION OF THE INVENTION

Figure 1:
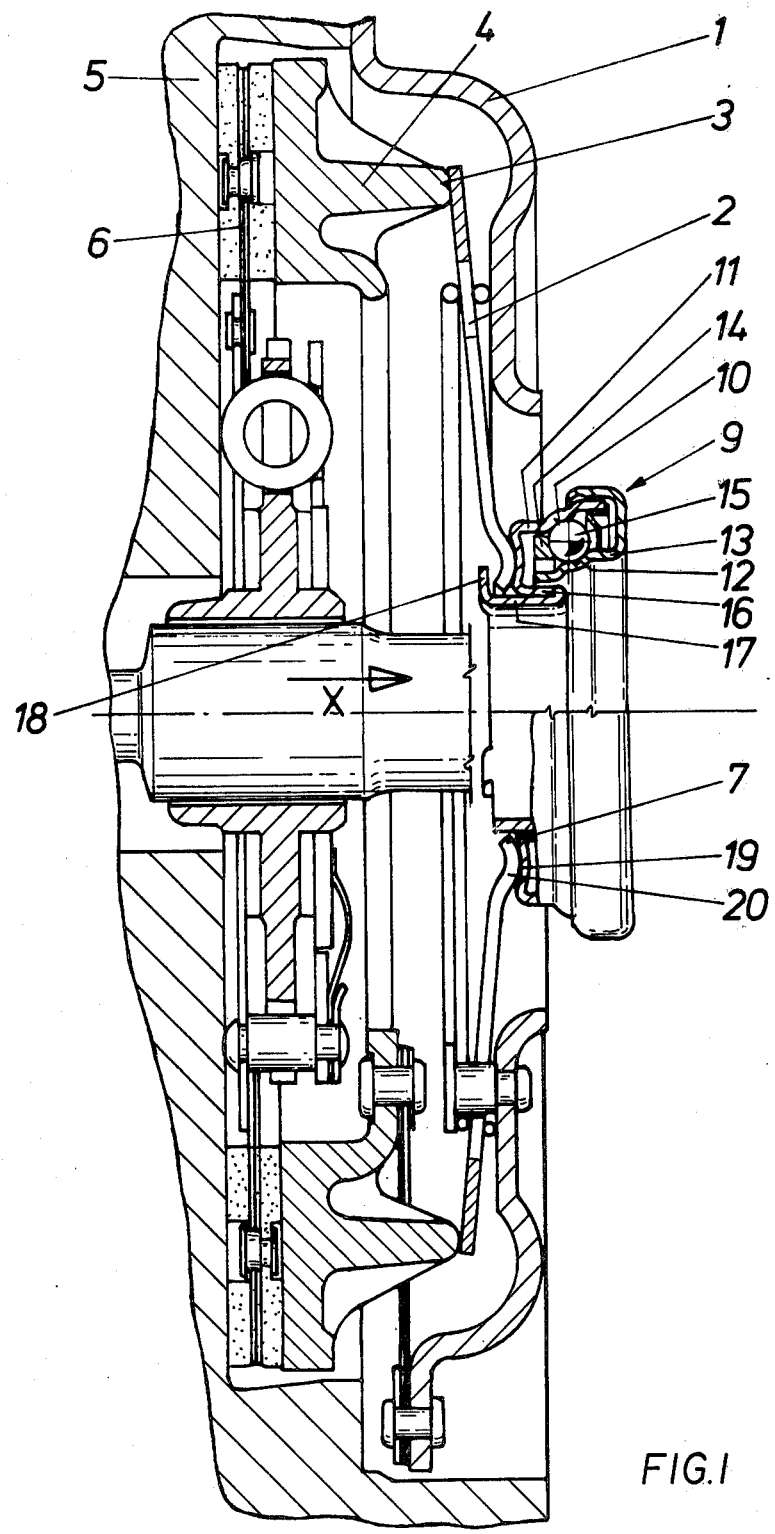
FIG. 1 shows a partial cross section through an assembly of friction clutch and clutch release bearing formed in accordance with the present invention.

As seen in FIG. 1 the friction clutch of the assembly, comprises an outer housing 1 having a spring release member 2, such as a diaphragm spring washer, acting on the annular axially projecting edge 3 of a pressure plate 4. Located behind the pressure plate 4 is a driven plate 5. Between the pressure plate and the driven plate there is arranged a clutch plate 6. In general this construction is quite conventional and requires no further description herein.

Figure 2:
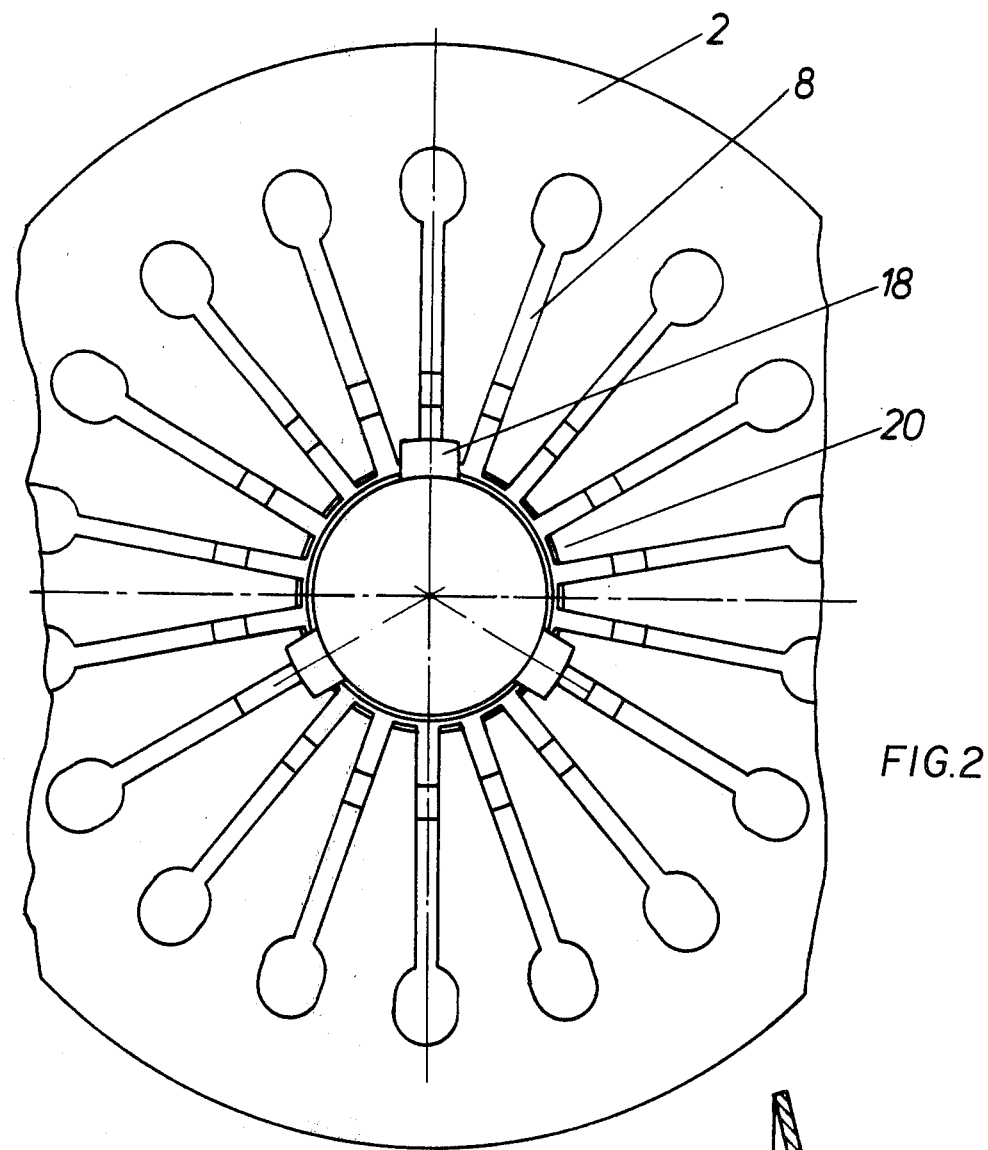
FIG. 2 is a view of the clutch release spring shown in FIG. 1 taken in the direction of the arrow X of FIG. 1, FIGS. 3 through 6 show partial cross sections of several forms of clutch release bearings embodying the present invention.

As seen more clearly in FIG. 2 the spring release member is formed with a central bore 7 and a plurality of radially extending slots 8 forming a plurality of similarly extending spring arms.

The clutch release bearing according to the present invention is generally referred to by the numeral 9. It consists of an outer race 10 formed on an outer bearing ring member 11, an inner race 12 formed on an inner bearing race member 13 between which a cage 14 holds a plurality of rolling bodies 15, such as balls. In general the bearing 9 is conventionally constructed to have inclined race surfaces so as to absorb the usual clutch release loads. Both of the bearing race rings have generally U-shaped cross sections. The axial inner shank 16 of the outer race ring member 11 is bent over 180° at its free end so that there is produced a ring shaped or cylindrical projection 17 which runs in an axial direction pointed away from the set of rolling bodies 15.

The ring shaped projection 17 passes through the bore 7 of the spring release member 2. The free end of this cylindrical shaped projection 17 has distributed uniformly about its periphery several tangs 18 or fins which are directed radially outwardly. These tangs 18 pass behind the rear wall or rear face of the spring release member 2 and thus act to fix the bearing in an axial direction. As may be seen from FIG. 2, the tangs 18 are preferably made wider than the width of the slots 8 of the spring release member 2 so that they bridge the slot and engage behind at least a pair of the radially extending arms formed in the spring release member. Simultaneously the outer race ring member 11 is provided with an annular radially extending wall portion 19 which is adapted to rest against the free ends 20 of the spring release member 2. The ring shaped portion 19 is curved, as shown in this Figure concavedly and the free ends 20 of the arms of the spring release member 2 are designed convexedly to conform thereto so that a self-centering effect is obtained under operable conditions.

Figure 3:
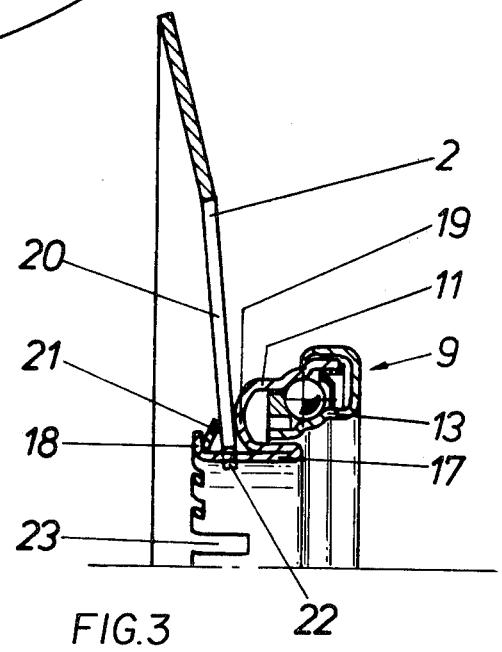

In FIG. 3 another embodiment of the clutch release bearing containing the present invention is depicted. The embodiment of FIG. 3 deviates only slightly from the construction of FIGS. 1 and 2 and similar reference numerals are used for similar elements. As seen in FIG. 3 the spring release member 2 is provided with arms having free ends 20 which are generally planar in form. Here the generally radially extending wall 19 is convex abutting against the flat planar surface of the free ends 20. Located between the radially extending tangs 18 and the rear surface of the spring release member 2 is a cup-shape or belleville type washer 21 which presses between the tangs 18 and the spring release member 20 so that the forward face of the spring release member 20 engages under some degree of pressure against the convex face of the wall 19. To secure the entire bearing 9 against rotation with relationship to the spring release member 2, some of the free ends 20 of the arms are provided with radially extending inward projections 22 which pass through correspondingly formed axial slots 23 formed in the axially extending projection 17 of the outer race ring 11.

Another embodiment is shown in FIG. 4 wherein the axially extending projection 17 is provided with a plurality of slots 24 distributed over its periphery. The slots 24 thus form axially extending projections 25 which have a general ring-shaped configuration similar to that of the projection 17 shown in the previous Figures. It is possible to compress the projecting fingers 25 radially so that the entire axial projection 17 may be easily inserted into the bore of the spring release member 2. In order to secure the bearing 9 from twisting in relationship to the spring release member 2, some of the fingers 25 are curved so as to provide bulges 26 which curve radially outward into the slots 8 formed in the spring release member. The bulges 26 engage with the slots 8 so as to cooperatively fix the bearing against rotational movement. As in the prior embodiments the free ends of the projection 17, here the free ends of the fingers 25 are provided with radially outward flanges or tangs which engage behind the spring release member 2 so as to fix the bearing axially. In other respects the assembly shown in FIG. 4 is similar to that of FIG. 3.

In FIGS. 5a and 5b another example of the clutch release bearing embodying the present invention is depicted. Here the free ends of the fingers 25 are provided with radially inwardly directed bulges 27 which are formed initially with a diameter significantly smaller than the diameter of the bore of the spring release member 2. Thus when the assembly is first put together and the bearing 9 inserted within the bore 7 of the spring release member 2 the fingers 25 do not engage with the spring release member 2. On installation, however, a mandrel shown here in dotted lines is forced into the bore of the outer race ring to slide against the axially extending projection 17. This forces the bulges 27 radially outwards into contact with the free ends of the arms of the spring release member. Thus the free edges 28 of the bulges 27 are adapted to pass behind the ends 20 of the arms of the spring release member 2 and thus fix the bearing 9 in the bore of the spring release member.

Still another embodiment is depicted in FIG. 6. Here an outer race ring indicated by the numeral 11' has a Z-shaped cross section. The shank 29 of the axial projecting portion 17, pointing away from the rolling bodies, passes through the bore of the spring release member 2. Several tangs 30, directed radially outwards are distributed over the peripheral edge of the shank 29 so as to fix the bearing in its axial direction. The radially extending wall portion 31 of the outer ring 11' facing the spring release member 2 is here made concave as indicated in FIG. 1 to conform with the ends of the arms of the spring release member 2. In the lower portion of the bearing according to FIG. 1 the inner race ring is shown with an axially extending portion lying adjacent to and parallel to the shank 29. As such this type of bearing is enclosed at both its ends and provides a truly sealed bearing. Otherwise the construction of the lower half of FIG. 6 is similar to that of the upper half.

Figures 7A, 7B:
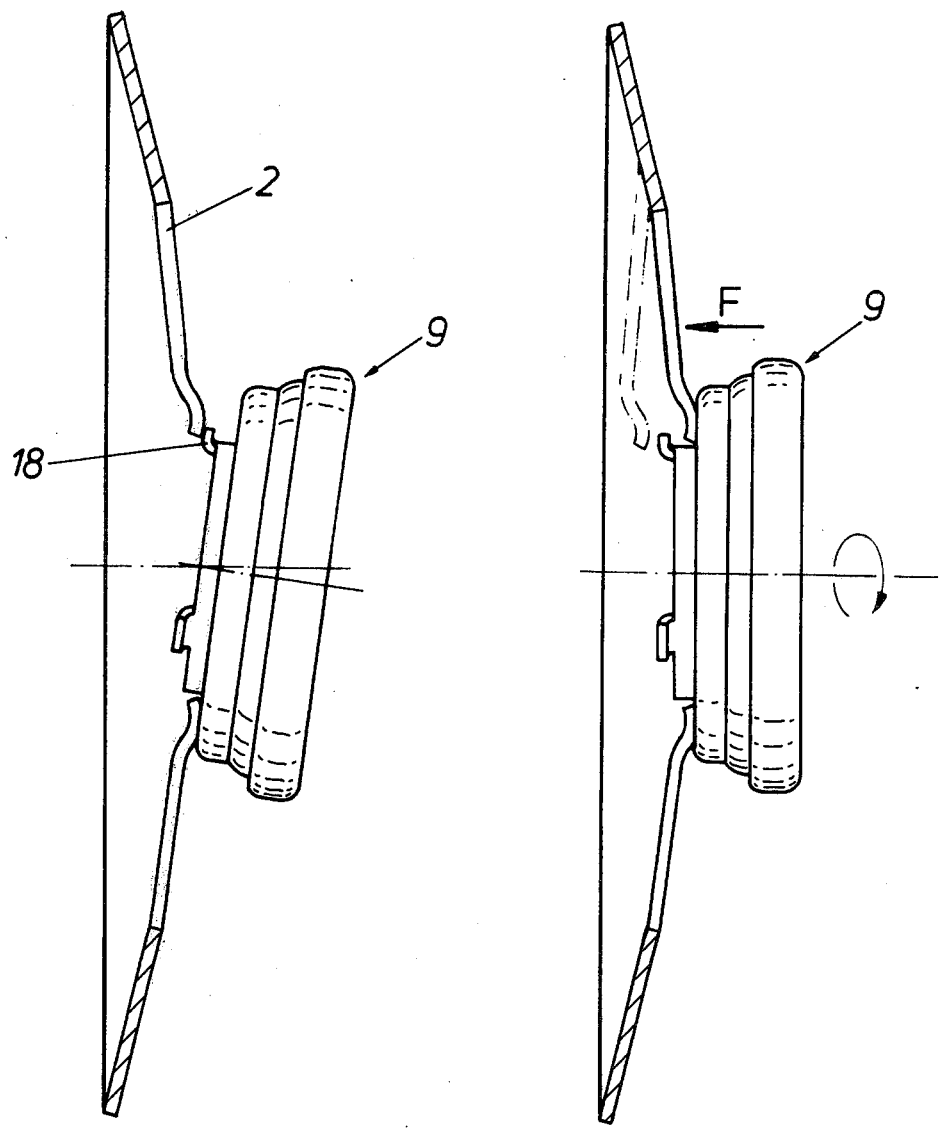
FIG. 7 shows different stages, labeled A and B for inserting the clutch release bearing shown in FIG. 6 within the bore of the spring release member.

As seen in FIG. 7 the installation of the bearing, represented by the construction shown in FIG. 6, within the bore of the spring release member 2 is shown. The bearing 9 is inserted at first obliquely into the bore with its axis tilted in relation to the axis of the spring release member 2. In the embodiment of FIG. 6, as seen in FIG. 7 the bearing is provided with three radially extending tangs 18 distributed over the peripheral edge of the axial projection 17. Two tangs engage behind the corresponding inner wall of the spring release member 2 on initial insertion as seen in FIG. A. Thereafter the bearing is rotated in such a way that the third tang comes to rest on the front surface of the spring release member 2. Thereafter the bearing 9 is pressed against the front surface of the spring release member 2 in the direction shown by the arrow F. This forces the resilient arms of the spring release member 2 rearwardly aligning the bearing along the axis of the spring release member P. Thereafter the bearing is rotated in a direction indicated by the circular arrow so that the third tang comes to rest behind an arm of the spring release member thereby allowing the otherwise initially flexed arm, indicated in dotted lines in FIG. 7b to resume its proper position.

As seen from the foregoing a rather simply and easy construction of clutch release bearings is shown which may be easily and simply assembled with the friction clutch itself. The clutch release bearing is preferably made of race members formed of sheet metal which may be conveniently folded as indicated in the prior description for both the purposes of its constructional configuration as well as for its structural strength and stability. Further, the ability to provide a sheet metal race enables the folding of the race member so as to provide axial abutting surfaces as well as radially resilient elements thus allowing the bearing to be fixed against axial as well as rotational movement. In each of the embodiments depicted an axially extending generally ring-shaped or cylindrical projection is formed on one of the race members the end of which is provided with either a annular flange or a plurality of tangs which engage behind the rear wall of the spring release member and is provided with a radially extending wall of curved shaped engaging the front face of the spring release member. The ability to slot the axial projection enables a more resilient construction to be made.

Various changes, modifications and embodiments have been suggested, other modifications and changes will be obvious to those skilled in the present art. Accordingly it is intended that the present disclosure be taken as illustrative and not as limiting of the present invention. The present invention is related to an invention disclosed and claimed in a co-pending application, Ser. No. 472,861, filed May 23, 1974, of the same inventors. In the related application there is disclosed a clutch release bearing in which one of the race members is formed with an annular shoulder extending substantially axially away from the roll bodies and having tabs uniformly distributed about its free end extending through the slots of the spring release member centrally between its central bore and its outer periphery. Reference to that disclosure may be made as if it were more fully set forth in the present application.

What is claimed is:

1. A clutch release bearing for attachment with a friction clutch comprising an annular spring release member formed with a plurality of slots forming radially inwardly directed arms defining a central bore, said clutch release bearing comprising an inner race member, an outer race member, and a plurality of rolling bodies located therebetween, said race members having inclined race runs providing a combined axial and radial bearing, said race members being respectively formed entirely of unitary sheet metal, said outer race member having an integral axial projection extending axially away from said roll bodies, said outer race member and said projection being formed of a unitary sheet metal member joined by an integral fold therebetween to form a ring-like central sleeve portion adapted to be freely inserted within the bore of said spring release member, a first radially extending circumferential flange to pass behind the rear of said spring release member to engage therewith, and a second radially extending circumferential flange extending radially in front of the front face of said spring release member, said second flange being bent in cross section to space the roll bodies axially from the plane of said spring release member, the arms of said spring release member having free ends entering into the central sleeve portion and engaging the radial flanges of said outer race member.

2. The clutch release bearing according to claim 1 wherein the second radial flange of said outer race member is folded to have a Z-shaped cross section.

3. The clutch release bearing according to claim 1 wherein the second radial flange of said outer race member is folded to have a U-shaped cross section and is further folded over 180° to provide a double wall forming said axially extending ring-like sleeve portion.

4. The clutch release bearing according to claim 1 wherein said ring-like sleeve projection is provided with axially directed slots.

5. The clutch release bearing according to claim 4 wherein said slots are adapted to receive the radially inwardly directed arms of said spring release member.

6. The clutch release bearing according to claim 1 wherein the axially extending ring-like sleeve is cylindrical and is provided with a plurality of tangs radially outwardly directed at its outer ends.

7. The clutch release bearing according to claim 6 wherein the width of the tangs is greater than the width of the slots in the spring release member.

8. The clutch release bearing according to claim 1 including a ring member inserted between the annular spring release member and the axial end of said cylindrical projection.

* * * * *